United States Patent [19]

Yoshioka et al.

[11] 4,403,065
[45] * Sep. 6, 1983

[54] POLYMERIC RESIN, AND ITS PRODUCTION AND USE

[75] Inventors: Tamotsu Yoshioka; Ryuzo Mizuguchi; Shinichi Ishikura; Keizo Ishii, all of Neyagawa, Japan

[73] Assignee: Nippon Paint Co., Ltd., Osaka, Japan

[*] Notice: The portion of the term of this patent subsequent to Jan. 5, 1999, has been disclaimed.

[21] Appl. No.: 197,322

[22] Filed: Oct. 15, 1980

[51] Int. Cl.³ ............................................. C08L 39/00
[52] U.S. Cl. ................................... 524/816; 524/812; 524/828; 524/831
[58] Field of Search ................. 260/29.6 H, 29.6 HN, 260/29.6 RW, 29.4 UA; 524/812, 819, 828, 829, 831, 816

[56] References Cited

U.S. PATENT DOCUMENTS 3,178,385  4/1965  Dinges et al. ............. 260/29.6 HN
4,140,664  2/1979  Mizuguchi et al. ......... 260/29.6 HN
4,309,327  1/1982  Ishikura et al. ............. 260/29.6 H Primary Examiner—John Kight, III
Assistant Examiner—Amelia B. Yarbrough
Attorney, Agent, or Firm—Wenderoth, Lind & Ponack

[57] ABSTRACT

An aqueous emulsion comprising a polymeric resin prepared by polymerizing (a) at least one amino acid of either one of the formula:

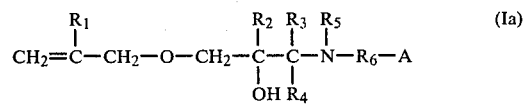

and the formula:

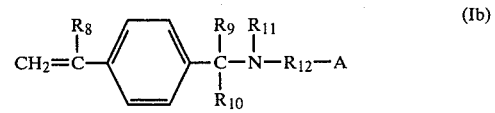

with (b) at least one other polymerizable monomer in an aqueous medium, the component (a) and at least a portion of the component (b) being introduced separately into the reaction system.

7 Claims, No Drawings

POLYMERIC RESIN, AND ITS PRODUCTION AND USE

The present invention relates to a polymeric resin, and its production and use. More particularly, it relates to a polymeric resin, an aqueous emulsion comprising such resin and a coating composition comprising such aqueous emulsion, and their production and use.

From the viewpoints of saving chemicals and preventing environmental pollution, attention has been drawn to water type resin compositions instead of organic solvent type resin compositions, and the research work towards water type resin compositions has been increased. Among various water type resin compositions, resinous emulsions are characteristic in using particularly high molecular weight polymers as the resin components. In such resinous emulsions, the polymeric particles are usually dispersed into aqueous media by the aid of lower molecular weight surfactants. When the resinous emulsions are applied onto substrates, the surfactants remain on the substrates, whereby the physical properties of the substrates such as water resistance and strength are more or less deteriorated.

As the result of an extensive study, it has now been found that a polymeric resin produced by polymerizing a polymerizable amino acid with any other polymerizable compound according to a certain specific procedure can afford a polymeric resin which is per se dispersible into an aqueous medium without any surfactant to give an aqueous emulsion. This aqueous emulsion is highly stable and, even when the solid content is relatively high, produces no lumps. The aqueous emulsion is useful as a coating composition. Particularly when the polymeric resin in the aqueous emulsion has a hydroxyl group and is used in combination with an aminoplast resin, the resulting coating composition can be thermoset at low temperatures to afford a coating film having a good water resistance.

According to the present invention, there is provided a process for preparing a polymeric resin, which comprises polymerizing (a) at least one amino acid of either one of the formulae Ia and Ib:

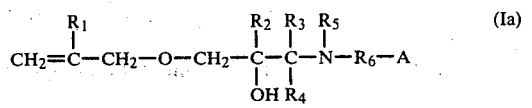
(Ia)

wherein $R_1$, $R_2$, $R_3$ and $R_4$ are each hydrogen, methyl or ethyl, $R_5$ is hydrogen or $C_1-C_{20}$ alkyl optionally having at least one of —SO—, —COO— and —O— in the alkyl chain, $R_6$ is $C_1-C_{12}$ alkylene optionally substituted with one or more of —OH, —SH, —SR$_7$ (wherein $R_7$ is $C_1-C_4$ alkyl) and $C_1-C_4$ alkyl, or phenylene optionally substituted with one or more of $C_1-C_4$ alkyl, and A is —COOH or —SO$_3$H;

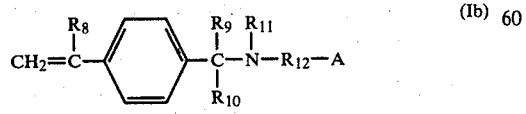
(Ib)

wherein $R_8$, $R_9$ and $R_{10}$ are each hydrogen or $C_1-C_6$ alkyl, $R_{11}$ is hydrogen, $C_1-C_{20}$ alkyl optionally having at least one of —SO—, —COO— and —O— in the alkyl chain, or a group of the formula

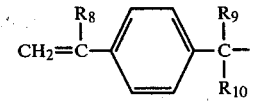

(wherein $R_8$, $R_9$ and $R_{10}$ are each as defined above), $R_{12}$ is $C_2-C_{12}$ alkylene optionally substituted with one or more $C_1-C_6$ alkyl, or phenylene optionally substituted with one or more $C_1-C_4$ alkyl, and A is as defined above, with (b) at least one of any other polymerizable monomer, in an aqueous medium, the component (a) and at least a portion of the component (b) being introduced separately into the reaction system.

The amino acids (Ia) and (Ib) and their production are known and disclosed in Japanese Patent Publications (unexamined) Nos. 51050/1980 and 53251/1980. The amino group and the acid residue in their molecules may be considered to be in a tautomeric state as shown by the following formula:

wherein $R_6$ is as defined above and B is —COO— or —SO$_3$—. Depending upon the environment, the above ionic part is further varied as shown by the following formula:

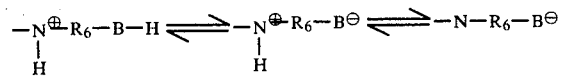

wherein $R_6$ and B are each as defined above. Accordingly, the state of the said ionic part can be optionally chosen by controlling the conditions of the environment such as pH.

The amino acids (Ia) which have good reactivity, surface active property, electro-chemical property and biochemical property, may be produced by reacting oxirane compounds with amino acid compounds having a primary or secondary amino group. Their examples are as follows:

N-(2-Hydroxy-3-allyloxypropyl)taurine;
2-N-(2-Hydroxy-3-allyloxypropyl)aminopropanesulfonic acid-(1);
1-[N-(2-Hydroxy-3-allyloxypropyl)]aminopropanesulfonic acid-(2);
3-[N-(2-Hydroxy-3-allyloxypropyl)]aminobutanesulfonic acid-(2);
2-[(N-(2-Hydroxy-3-allyloxypropyl))]aminobutanesulfonic acid-(1);
1-[N-(2-Hydroxy-3-allyloxypropyl)]amino-2-methylpropanesulfonic acid-(2);
3-[(N-(2-Hydroxy-3-allyloxypropyl))]aminopentanesulfonic acid-(2);
4-[N-(2-Hydroxy-3-allyloxypropyl)]amino-2-methylpentanesulfonic acid-(3);
3-[N-(2-Hydroxy-3-allyloxypropyl)]aminopropanesulfonic acid-(1);
4-[N-(2-Hydroxy-3-allyloxypropyl)]aminobutanesulfonic acid-(2);
4-[N-(2-Hydroxy-3-allyloxypropyl)]aminobutanesulfonic acid-(1);

5-[N-(2-Hydroxy-3-allyloxypropyl)]aminopentanesulfonic acid-(1);
10-[N-(2-Hydroxy-3-allyloxypropyl)]aminodecanesulfonic acid-(1);
N-Methyl-N-(2-hydroxy-3-allyloxypropyl)taurine;
N-Ethyl-N-(2-hydroxy-3-allyloxypropyl)taurine;
N-Propyl-N-(2-hydroxy-3-allyloxypropyl)taurine;
N-Butyl-N-(2-hydroxy-3-allyloxypropyl)taurine;
N-Heptyl-N-(2-hydroxy-3-allyloxypropyl)taurine;
N-Dodecyl-N-(2-hydroxy-3-allyloxypropyl)taurine;
N-Heptadecyl-N-(2-hydroxy-3-allyloxypropyl)-taurine;
N-(2-Octadecylsulfinethyl)-N-(2-hydroxy-3-allyloxypropyl)taurine;
N-(2-Stearoyloxyethyl)-N-(2-hydroxy-3-allyloxypropyl)taurine;
N-(2-Hydroxy-3-methallyloxypropyl)taurine;
N-(1-Methyl-2-hydroxy-3-allyloxypropyl)taurine;
N-(2-Hydroxy-3-allyloxypropyl)glycine;
N-(2-Hydroxy-3-methallyloxypropyl)glycine;
N-(2-Hydroxy-3-methallyloxypropyl)sarcosine;
N-(2-Hydroxy-3-allyloxypropyl)alanine;
N-(2-Hydroxy-3-allyloxypropyl)-β-alanine;
N-Methyl-N-(2-hydroxy-3-allyloxypropyl)-β-alanine;
N-Ethyl-N-(2-hydroxy-3-allyloxypropyl)-β-alanine;
N-Butyl-N-(2-hydroxy-3-allyloxypropyl)-β-alanine;
N-Heptyl-N-(2-hydroxy-3-allyloxypropyl)-β-alanine;
N-Dodecyl-N-(2-hydroxy-3-allyloxypropyl)-β-alanine;
N-Heptadecyl-N-(2-hydroxy-3-allyloxypropyl)-β-alanine;
N-(1-Methyl-2-hydroxy-3-allyloxypropyl)-β-alanine;
N-(2-Hydroxy-3-allyloxypropyl)-ε-aminocaproic acid;
N-(2-Hydroxy-3-allyloxypropyl)threonine;
N-(2-Hydroxy-3-allyloxypropyl)cysteine;
N-(2-Hydroxy-3-allyloxypropyl)methionine;
N-(2-Hydroxy-3-allyloxypropyl)anthranilic acid;
N-(2-Hydroxy-3-allyloxypropyl)-m-aminobenzoic acid;
N-(2-Hydroxy-3-allyloxypropyl)-p-aminobenzoic acid;
N-(2-Hydroxy-3-allyloxypropyl)orthanilic acid;
N-(2-Hydroxy-3-allyloxypropyl)metanilic acid;
N-(2-Hydroxy-3-allyloxypropyl)sulfanilic acid, etc.

The amino acids (Ib) have also good reactivity, surface activity, electro-chemical property and bio-chemical property and may be produced by reacting benzyl halide compounds with aminosulfonic acid compounds having a primary or secondary amino group. Their specific examples are as follows:

N-(Vinylbenzyl)taurine;
N-(Isopropenylbenzyl)taurine;
2-[N-(Vinylbenzyl)]aminopropanesulfonic acid-(1);
2-[N-(Isopropenylbenzyl)]aminopropanesulfonic acid-(1);
1-[N-(Vinylbenzyl)]aminopropanesulfonic acid-(2);
1-[N-(Isopropenylbenzyl)]aminopropanesulfonic acid-(2);
3-[N-(Vinylbenzyl)]aminobutanesulfonic acid-(2);
3-[N-(Isopropenylbenzyl)]aminobutanesulfonic acid-(2);
2-[N-(Vinylbenzyl)]aminobutanesulfonic acid-(1);
2-[N-(Isopropenylbenzyl)]aminobutanesulfonic acid-(1);
1-[N-(Vinylbenzyl)]amino-2-methylpropanesulfonic acid-(2);
1-[N-(Isopropenylbenzyl)]amino-2-methylpropanesulfonic acid-(2);
3-[N-(Vinylbenzyl)]aminopentanesulfonic acid-(2);
3-[N-(Isopropenylbenzyl)]aminopentanesulfonic acid-(2);
4-[N-(Vinylbenzyl)]amino-2-methylpentanesulfonic acid-(3);
4-[N-(Isopropenylbenzyl)]amino-2-methylpentanesulfonic acid-(3);
3-[N-(Vinylbenzyl)]aminopropanesulfonic acid-(1);
3-[N-(Isopropenylbenzyl)]aminopropanesulfonic acid-(1);
4-[N-(Vinylbenzyl)]aminobutanesulfonic acid-(2);
4-[N-(Isopropenylbenzyl)]aminobutanesulfonic acid-(2);
4-[N-(Vinylbenzyl)]aminobutanesulfonic acid-(1);
4-[N-(Isopropenylbenzyl)]aminobutanesulfonic acid-(1);
5-[N-(Vinylbenzyl)]aminopentanesulfonic acid-(1);
5-[N-(Isopropenylbenzyl)]aminopentanesulfonic acid-(1);
10-[N-(Vinylbenzyl)]aminodecanesulfonic acid-(1);
10-[N-(Isopropenylbenzyl)]aminodecanesulfonic acid-(1);
N-Methyl-N-(vinylbenzyl)taurine;
N-Methyl-N-(isopropenylbenzyl)taurine;
N-Ethyl-N-(vinylbenzyl)taurine;
N-Ethyl-N-(isopropenylbenzyl)taurine;
N-Propyl-N-(vinylbenzyl)taurine;
N-Propyl-N-(isopropenylbenzyl)taurine;
N-Butyl-N-(vinylbenzyl)taurine;
N-Butyl-N-(isopropylbenzyl)taurine;
N-Heptyl-N-(vinylbenzyl)taurine;
N-Heptyl-N-(isopropenylbenzyl)taurine;
N-Dodecyl-N-(vinylbenzyl)taurine;
N-Dodecyl-N-(isopropylbenzyl)taurine;
N-Heptadecyl-N-(vinylbenzyl)taurine;
N-Heptadecyl-N-(isopropenylbenzyl)taurine;
N-(2-Octadecylsulfinethyl)-N-(vinylbenzyl)taurine;
N-(2-Octadecylsulfinethyl)-N-(isopropenylbenzyl)taurine;
N-(2-Stearoyloxyethyl)-N-(vinylbenzyl)taurine;
N-(2-Stearoyloxyethyl)-N-(isopropenylbenzyl)-taurine;
2-[N-(Vinylbenzyl)-N-methyl]aminopropanesulfonic acid-(1);
2-[N-(Isopropenylbenzyl)-N-methyl]aminopropanesulfonic acid-(1);
2-[N-Dodecyl-N-(vinylbenzyl)]aminopropanesulfonic acid-(1);
2-[N-Dodecyl-N-(isopropenylbenzyl)]aminopropanesulfonic acid-(1);
2-[N-Octadecyl-N-(vinylbenzyl)]aminopropanesulfonic acid-(1);
2-[N-(Isopropenylbenzyl)-N-octadecyl]aminopropanesulfonic acid-(1);
1-[N-Methyl-N-(vinylbenzyl)]amino-2-methylpropanesulfonic acid-(2);
1-[N-(Isopropenylbenzyl)-N-methyl]amino-2-methylpropanesulfonic acid-(2);
3-[N-Methyl-N-(vinylbenzyl)]aminopropanesulfonic acid-(1);
3-[N-(Isopropenylbenzyl)-N-methyl]aminopropanesulfonic acid-(1);
N-(Vinylbenzyl)orthanilic acid;
N-(Vinylbenzyl)methanilic acid;
N-(Vinylbenzyl)sulfanilic acid, etc.

The other polymerizable monomer may be any monomer having an ethylenic unsaturation, which is usually employed for polymerization. Specific examples are as follows:

(1) Carboxyl group-containing monomers: acrylic acid, methacrylic acid, crotonic acid, itaconic acid, maleic acid, fumaric acid, etc.
(2) Hydroxyl group-containing monomers: 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methallyl alcohol, etc.
(3) Nitrogen-containing alkyl acrylates and methacrylates: dimethylaminoethyl acrylate, dimethylaminoethyl methacrylate, etc.
(4) Polymerizable amides: acrylic acid amide, methacrylic acid amide, etc.
(5) Polymerizable nitriles: acrylamide, methacrylamide, etc.
(6) Alkyl acrylates and methacrylates: methyl acrylate, methyl methacrylate, ethyl acrylate, n-butyl acrylate, n-butyl methacrylate, 2-ethylhexyl acrylate, etc.
(7) Polymerizable aromatic compounds: styrene, α-methylstyrene, vinyltoluene, t-butylstyrene, etc.
(8) α-Olefin compounds: ethylene, propylene, etc.
(9) Vinyl compounds: vinyl acetate, vinyl propionate, etc.
(10) Diene compounds: butadiene, isoprene, etc.

When any water-soluble monomer such as the monomers (1) to (5) is chosen from the above other polymerizable monomers and subjected to polymerization as the component (b) with the amino acid as the component (a), the units of the amino acid and of the other polymerizable monomer may be arranged from the outer shell of each particle of the produced polymeric resin in the aqueous emulsion towards the inside with concentration inclinations, and as the result, the physical properties of the aqueous emulsion and of the coating film produced therefrom may be excellent.

The polymerization may be carried out with the amino acid as the component (a) and the other polymerizable monomer as the component (b) in an appropriate proportion depending on the stability and the coating performances of the aqueous emulsion comprising the produced polymeric resin. Usually, the amount of the amino acid may be from 0.2 to 30% by weight, particularly from 0.5 to 15% by weight, on the basis of the total weight of the monomeric components. When the amount is less than 0.2% by weight, the dispersion stability of the particles of the polymeric resin in an aqueous medium is inferior. When the amount is more than 30% by weight, the water resistance of the coated film formed by the use of the aqueous emulsion of the polymeric resin is deteriorated. In case of using a water-soluble monomer as the other polymerizable monomer, its amount is usually not more than 40% by weight on the basis of the total weight of the monomeric components. The use of the water-soluble monomer in an amount of more than 40% by weight may result in deterioration of the water resistance of the coated film.

The polymerization is effected by the so-called "two liquid addition method." Namely, the amino acid and the other polymerizable monomer are separately introduced into the reaction system, i.e. an aqueous medium containing a polymerization initiator, by dropwise addition. When a water-soluble monomer such as the monomers (1) to (5) is used as a part of the other polymerizable monomer as the component (b), a portion of the entire amount of such water-soluble monomer may be introduced into the reaction system not separately from but in combination with the amino acid.

As the polymerization initiator, there may be employed any conventional one. Specific examples are organic peroxides (e.g. benzoyl peroxide, t-butyl peroxide, cumene hydroperoxide), organic azo compounds (e.g. azobisisobutyronitrile, azobiscyanovaleric acid, azobis(2,4-dimethyl)valeronitrile, azobis(2-amidinopropane) hydrochloride), inorganic peroxides (e.g. potassium persulfate, ammonium persulfate, sodium persulfate, hydrogen peroxide), etc. Redox system initiators comprising said inorganic peroxides with sodium pyrosulfite, sodium hydrogensulfite, divalent ferric ion or the like is also usable. The polymerization initiator may be incorporated into the reaction system prior to the introduction of the monomeric components, or it may be added to the reaction system together with any of the monomeric components. The amount of the polymerization initiator is usually from 0.05 to 5% by weight, preferably from 0.1 to 3% by weight, on the basis of the total weight of the monomeric components.

If necessary, any conventional chain transfer agent may be incorporated into the reaction system. Examples of such chain transfer agent are mercaptans (e.g. laurylmercaptan, hexylmercaptan). It is usually employed in combination with the other polymerizable monomer as the component (b). While any conventional lower molecular weight emulsifier or dispersing agent may be used in such an amount as not affording any unfavorable influence on the produced polymeric resin or the aqueous emulsion comprising the same, its use can be normally omitted since the amino acids as the component (a) itself has an emulsifying or dispersing effect.

A typical example of the polymerization is as follows:

In an inert atmosphere of atmospheric or elevated pressure, an aqueous medium (e.g. water or its mixture with any water-miscible organic solvent) comprising a polymerization initiator is maintained at a temperature for polymerization, usually between 4° and 100° C. The amino acid or its mixture with the other polymerizable monomer soluble in water, or an aqueous solution thereof optionally containing any basic substance, and the rest of the other polymerizable monomer, are separately and simultaneously introduced into the aqueous medium in 10 to 300 minutes by dropwise addition. After the dropwise addition is completed, the resultant mixture is maintained at the same temperature as above for a period of 5 minutes to 10 hours.

As the result of the polymerization as above, there is obtained an aqueous emulsion comprising the produced polymeric resin stably dispersed therein, of which the appearance is milky to creamy, the viscosity at 25° C. is from 10 to 50,000 cps and the content of non-volatile components is from 2 to 65% by weight.

From the above obtained aqueous emulsion, the polymeric resin can be recovered by a per se conventional separation procedure. The glass transition temperature (Tg) of the polymeric resin is from −60° to 100° C. Since, however, the aqueous emulsion is per se useful as a coating composition, the separation of the polymeric resin therefrom is practically not required.

As stated above, the aqueous emulsion of the invention is per se useful as a coating composition. In general, however, the aqueous emulsion may be incorporated with other resinous vehicles such as aminoplast resins (e.g. melamine resin, urea resin, guanamine resin), phenoplast resins and epoxy resins, organic or inorganic pigments, additives such as filters, viscosity enhancers and adhesive agents, surfactants, pH regulators, water, organic solvents, etc. to make a coating composition.

Particularly when the aqueous emulsion comprises the polymeric resin produced by the use of a hydroxyl group-containing polymerizable monomer as the other polymerizable monomer, the incorporation of an aminoplast resin therein affords a coating composition having excellent thermosetting property at low temperatures and giving a coated film having good water resistance.

The coating composition of the invention as prepared above may be applied onto an appropriate substrate (e.g. metal plate, wooden plate, paper sheet, plastic sheet) by a conventional procedure to make a coating layer of 5 to 500 microns in thickness, followed by curing at a temperature of 60° to 240° C. for a period of 20 seconds to 60 minutes to give a thermoset film having good physical properties.

Practical and presently preferred embodiments of this invention are illustratively shown in the following examples wherein part(s) and % are by weight unless otherwise indicated.

REFERENCE EXAMPLE 1

In a 2 liter volume flask equipped with a stirrer, deionized water (400 g), N-methyltaurine sodium salt (161 g) and ethylene glycol monomethyl ether (300 g) were charged, and the temperature was elevated up to 70° C. To the resultant mixture under stirring, a mixture of vinylbenzyl chloride (153 g), ethylene glycol monomethyl ether (100 g) and p-nitrosophenol (0.15 g) was dropwise added in 1 hour, during which sodium hydroxide was added thereto 6 times (8 g each) every 10 minutes. Stirring was further continued for 5 hours.

The reaction mixture was admixed with conc. hydrochloric acid (120 g) and concentrated by the aid of a rotary evaporator to make a volume of ½. The concentrated liquor was added to a 4 time volume of acetone, and the separated sodium chloride was eliminated by filtration. The filtrate was concentrated by the aid of a rotary evaporator to remove 70% or more of the solvent in the filtrate. To the concentrated liquor, a 5 time volume of acetone was added, whereby a pale yellow solid material was precipitated. The solid material was collected and recrystallized from deionized water to give N-methyl-N-(vinylbenzyl)taurine (hereinafter referred to as "Compound A") (180 g) having the formula:

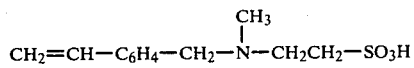

REFERENCE EXAMPLE 2

In a 2 liter volume flask equipped with a stirrer, taurine (125 g), sodium hydroxide (40 g), deionized water (200 g) and ethylene glycol monoethyl ether (600 g) were charged, and while maintaining the temperature at 60° C. under stirring, allyl glycidyl ether (114 g) and p-nitrosophenol (0.1 g) were added thereto dropwise in 20 minutes, followed by further stirring for additional 2 hours.

The reaction mixture of pH 9 was treated with an ion exchange resin (Amberlite IR-120) to eliminate sodium ion. The resulting solution of pH 4 was concentrated by the aid of a rotary evaporator to remove 30% of the solvent therein, whereby needle crystals were precipitated. By NMR and IR, these crystals were identified as unreacted taurine. The liquid portion was added to a 3 time volume of acetone to deposit a brown oily material, which was collected and dried in vacuo to give N-(2-hydroxy-3-allyloxypropyl)taurine (hereinafter referred to as "Compound B") (96 g) having the formula:

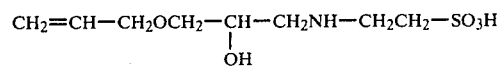

EXAMPLE 1

In a reactor equipped with an agitator, deionized water (216 parts) was charged, and while maintaining the temperature at 80° C. under stirring, a mixture of azobiscyanovaleric acid (4.5 parts), triethylamine (4.9 parts) and deionized water (45 parts) was added thereto. To the resultant mixture maintained at the same temperature as above, a first mixture comprising Compound A (6 parts), triethylamine (2.4 parts) and deionized water (90 parts) and a second mixture comprising methyl methacrylate (159 arts) and n-butyl acrylate (135 parts) were separately and simultaneously dropwise added in 60 minutes. After completion of the dropwise addition, a mixture of azobiscyanovaleric acid (1.5 parts), triethylamine (1.6 parts) and deionized water (15 parts) was added to the resulting mixture maintained at the same temperature as above, and stirring was continued for 60 minutes to give an aqueous emulsion comprising the particles of the polymeric resin. The aqueous emulsion had a content of non-volatile components of 45%, a pH of 7.5 and a viscosity of 52 cps at 25° C. The aqueous emulsion did not contain any lumps and had a good mechanical stability. The particle size of the polymeric resin was 0.213μ and, on electron microscopic observation, was substantially even. The polymeric resin had a high molecular weight and was insoluble in tetrahydrofuran so that the gel permeation chromatography (GPC) could not be measured. Tg, 12° C.

The said viscosity was determined by the use of a B type viscosimeter, and the particle size was measured according to the light diffusion method and using an electron microscope. The mechanical stability was determined by rubbing one drop of the aqueous emulsion five times between thumb and forefinger, and no occurrence of any adhesion was taken as good.

EXAMPLE 2

In a reactor equipped with an agitator, deionized water (180 parts) was charged, and while maintaining the temperature at 80° C. under a nitrogen atmoshpere with stirring, potassium persulfate (0.675 part) and sodium hydrogen sulfite (0.225 part) were added. To the resultant mixture maintained at the same temperature as above, a first mixture comprising Compound B (6 parts), 2-hydroxyethyl acrylate (30 parts) and deionized water (90 parts) and a second mixture comprising methyl methacrylate (77.4 parts), n-butyl acrylate (103.2 parts) and styrene (77.4 parts) were separately and simultaneously dropwise added in 12 minutes. After completion of the dropwise addition, a mixture of potassium persulfate (0.255 part), sodium hydrogensulfite (0.075 part) and deionized water (30 parts) was added thereto while maintaining the same temperature as above, and stirring was continued for 60 minutes to give an aqueous emulsion comprising the particles of the polymeric resin and having a content of non-volatile components of 45%, a pH of 2.8 and a viscosity of 50 cps at 25° C. The aqueous emulsion contained no lumps and had a good mechanical stability. The particle size of the polymeric resin was 0.156μ and was substantially even. The polymeric resin had a high molecular weight and was insoluble in tetrahydrofuran so that GPC could not be measured. Tg, 15° C.

EXAMPLE 3

In a reactor equipped with an agitator, deionized water (216 parts) was charged, and while maintaining the temperature at 80° C. under stirring, azobiscyanovaleric acid (4.5 parts), dimethylethanolamine (4.28 parts) and deionized water (45 parts) were added thereto. To the resultant mixture maintained at the same temperature as above, a first mixture comprising Compound A (6 parts), dimethylethanolamine (2.1 parts), 2-hydroxyethyl acrylate (6 parts) and deionized water (90 parts) and a second mixture comprising methyl methacrylate (77.4 parts), n-butyl acrylate (103.2 parts), styrene (77.4 parts) and 2-hydroxyethyl acrylate (24 parts) were separately and simultaneously dropwise added in 60 minutes. After completion of the dropwise addition, a mixture of azobiscyanovaleric acid (1.5 parts), dimethylethanolamine (1.42 parts) and deionized water (1.5 parts) was added thereto, and stirring was continued for 60 minutes to give an aqueous emulsion comprising the particles of the polymeric resin and having a content of non-volatile components of 45%, a pH of 7.5 and a viscosity of 33 cps at 25° C. The aqueous emulsion contained no lumps and had a good mechanical stability. The particle size of the polymeric resin was 0.126μ and was substantially even. The polymeric resin had a high molecular weight and was insoluble in tetrahydrofuran so that GPC could not be measured. Tg, 15° C.

EXAMPLES 4 TO 23

In the same manner as in Example 3 but using the first mixture and the second mixture as shown in Table 1 and taking the time for dropwise addition as indicated in Table 1, an aqueous emulsion comprising the particles of the polymeric resin was produced. The properties of the aqueous emulsion and the polymeric resin are shown in Table 1.

TABLE 1

| Example No. | 1st mixture A | 1st mixture DMEA | 1st mixture 2-HEA | 1st mixture 2-HEMA | De-ionized water | Component (part(s)) MMA | n-BMA | ST | n-BA | 2nd mixture 2-EHA | LMA | 2-HEA | 2-HEMA | AA | LM | Time for dropwise addition (min) | Non-volatile component (%) | pH | Viscosity (cps) (25° C.) | Particle size (μ) | Mechanical stability | Distribution of particle | Resin Tg (°C.) |
|---|---|---|---|---|---|---|---|---|---|---|---|---|---|---|---|---|---|---|---|---|---|---|---|
| 4 | 3 | 1.05 | 6 | — | 90 | 80.1 | — | 80.1 | 106.8 | — | — | 24 | — | — | — | 60 | 45 | 7.5 | 34 | 0.128 | Good | Uniform | 15 |
| 5 | 12 | 4.2 | — | — | 90 | 77.4 | — | 77.4 | 103.2 | — | — | 30 | — | — | — | 60 | 45 | 7.2 | 60 | 0.125 | Good | Uniform | 15 |
| 6 | 6 | 2.1 | 6 | — | 90 | 77.4 | — | 77.4 | 103.2 | — | — | 24 | 6 | — | — | 60 | 45 | 4.9 | 70 | 0.159 | Good | Uniform | 16 |
| 7 | 6 | 2.1 | 6 | — | 90 | 79.2 | — | 79.2 | 105.6 | — | — | 24 | — | — | 6 | 60 | 45 | 7.5 | 33 | 0.125 | Good | Uniform | 15 |
| 8 | 6 | 2.1 | 3 | — | 90 | 79.2 | — | 79.2 | 106.8 | — | — | 27 | — | — | — | 20 | 45 | 7.5 | 32 | 0.122 | Good | Uniform | 15 |
| 9 | 3 | 1.05 | 6 | — | 90 | 80.1 | — | 80.1 | 106.8 | — | — | 24 | — | — | — | 20 | 45 | 7.5 | 36 | 0.132 | Good | Uniform | 15 |
| 10 | 6 | 2.1 | 6 | — | 90 | 79.2 | — | 79.2 | 105.6 | — | — | 24 | — | — | — | 20 | 45 | 7.5 | 24 | 0.172 | Good | Uniform | 15 |
| 11 | 9 | 3.15 | 6 | — | 90 | 78.3 | — | 78.3 | 104.4 | — | — | 24 | — | — | — | 20 | 45 | 7.5 | 33 | 0.178 | Good | Uniform | 15 |
| 12 | 12 | 4.2 | 6 | — | 90 | 77.4 | — | 77.4 | 103.2 | — | — | 24 | — | — | — | 20 | 45 | 7.5 | 137 | 0.199 | Good | Uniform | 16 |
| 13 | 6 | 2.1 | 6 | — | 90 | 77.4 | — | 77.4 | 103.2 | — | — | 24 | — | 6 | — | 20 | 45 | 5.0 | 80 | 0.165 | Good | Uniform | 16 |
| 14 | 12 | 4.2 | 6 | — | 90 | 75.6 | — | 75.6 | 100.8 | — | — | 24 | — | 6 | — | 20 | 45 | 5.3 | 124 | 0.153 | Good | Uniform | 15 |
| 15 | 12 | 4.2 | 6 | — | 90 | 77.4 | — | 77.4 | 105.6 | — | — | 24 | — | — | — | 60 | 45 | 7.5 | 61 | 0.145 | Good | Uniform | 15 |
| 16 | 6 | 2.1 | 6 | — | 90 | 79.2 | — | 79.2 | 103.2 | — | — | 24 | — | — | — | 120 | 45 | 7.5 | 32 | 0.122 | Good | Uniform | 22 |
| 17 | 6 | 2.1 | 6 | — | 90 | 70.2 | — | 70.2 | 93.6 | — | — | 24 | — | — | — | 60 | 45 | 6.0 | 55 | 0.181 | Good | Uniform | 17 |
| 18 | 6 | 2.1 | 6 | — | 90 | 83.7 | — | 83.7 | 111.6 | — | — | 15 | — | 30 | — | 60 | 45 | 7.4 | 35 | 0.130 | Good | Uniform | 11 |
| 19 | 6 | 2.1 | — | — | 90 | 70.2 | — | 70.2 | 93.6 | — | — | — | — | — | — | 60 | 45 | 7.2 | 40 | 0.125 | Good | Uniform | 19 |
| 20 | 30 | — | 60 | — | 90 | 63 | — | 63 | 84 | — | — | 30 | — | — | — | 60 | 45 | 7.2 | 45 | 0.095 | Good | Uniform | 8 |
| 21 | 12 | 4.2 | 30 | — | 90 | 59.4 | — | 59.4 | 79.2 | 90 | — | 84 | — | — | — | 60 | 45 | 7.2 | 42 | 0.136 | Good | Uniform | −33 |
| 22 | 3 | 1.05 | 6 | — | 90 | — | 60 | 57 | — | — | 60 | 24 | — | — | — | 60 | 45 | 7.3 | 94 | 0.135 | Good | Uniform | 56 |
| 23 | 6 | 2.1 | — | 6 | 90 | 105.6 | — | 105.6 | 52.8 | — | — | — | 24 | — | — | 60 | 45 | 7.5 | 44 | 0.127 | Good | Uniform | 56 |

Note:
A = Compound A obtained in Reference Example 1;
DMEA = dimethylethanolamine;
2-HEA = 2-hydroxyethyl acrylate;
2-HEMA = 2-hydroxyethyl methacrylate;
MMA = methyl methacrylate;
n-BMA = n-butyl methacrylate;
ST = styrene;
n-BA = n-butyl acrylate;
2-EHA = 2-ethylhexyl acrylate;
LMA = dodecyl methacrylate;
AA = acrylic acid;
LM = dodecylmercaptan

EXAMPLE 24

In the same manner as in Example 3 but using deionized water (110 parts) to be charged in the reactor at the initial stage, an aqueous dispersion comprising the particles of the polymeric resin was produced. The aqueous emulsion had a content of non-volatile components of 60% and a pH of 7.5. The particle size of the polymeric resin was 0.103μ and was substantially even.

EXAMPLE 25

In the same manner as in Example 3 but using Compound B (6 parts) in place of Compound A (6 parts) and dimethylethanolamine (2.1 parts), an aqueous dispersion comprising the particles of the polymeric resin was produced. The aqueous emulsion had a content of non-volatile components of 45%, a pH of 7.5 and a viscosity of 35 cps. The particle size of the polymeric resin was 0.150μ and was substantially even. Tg, 15° C.

EXAMPLE 26

In a reactor equipped with an agitator, deionized water (216 parts) and sodium dodecylbenzenesulfonate (1.5 parts) were charged, and while maintaining the temperature at 80° C. under stirring, azobiscyanovaleric acid (4.5 parts), dimethylethanolamine (4.28 parts) and deionized water (45 parts) were added thereto. To the resultant mixture, a first mixture comprising Compound B (6 parts), dimethylethanolamine (2.1 parts), 2-hydroxyethyl acrylate (6 parts) and deionized water (90 parts) and a second mixture comprising methyl methacrylate (77.4 parts), n-butyl acrylate (103.2 parts), styrene (77.4 parts) and 2-hydroxyethyl acrylate (24 parts) were separately and simultaneously added dropwise in 20 minutes. After completion of the dropwise addition, a mixture of azobiscyanovaleric acid (1.5 parts), dimethylethanolamine (1.42 parts) and deionized water (15 parts) was added to the resultant mixture, and stirring was continued for 60 minutes to give an aqueous emulsion comprising the particles of the polymeric resin and having a content of non-volatile components of 45%, a pH of 7.5 and a viscosity of 45 cps at 25° C. The particle size of the polymeric resin was 0.170μ and was substantially even. Tg, 15° C.

EXAMPLE 27

In the same manner as in Example 26 but using a compound of the formula:

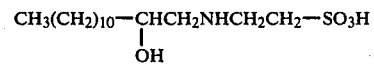

(1.5 parts) and dimethylethanolamine (0.42 part) in place of sodium dodecylbenzenesulfonate (1.5 parts), an aqueous emulsion comprising the particles of the polymeric resin was produced. The aqueous emulsion had a content of non-volatile components of 45%, a pH of 7.5 and a viscosity of 45 cps at 25° C. The particle size of the polymeric resin was 0.137μ and was substantially even. Tg, 15° C.

EXAMPLE 28

In a reactor equipped with an agitator, deionized water (216 parts) was charged, and while maintaining the temperature at 80° C. under stirring, a mixture comprising azobiscyanovaleric acid (4.5 parts), dimethylethanolamine (4.28 parts) and deionized water (45 parts) and a mixture comprising Compound B (3 parts), 2-hydroxyethyl acrylate (3 parts) and deionized water (45 parts) were added thereto. To the resultant mixture maintained at the same temperature as above, a first mixture comprising Compound B (3 parts), 2-hydroxyethyl acrylate (3 parts) and deionized water (45 parts) and a second mixture comprising methyl methacrylate (79.2 parts), n-butyl acrylate (105.6 parts), styrene (79.2 parts) and 2-hydroxyethyl acrylate (24 parts) were separately and simultaneously dropwise added in 60 minutes. After completion of the dropwise addition, azobiscyanovaleric acid (1.5 parts), dimethylethanolamine (1.42 parts) and deionized water (15 parts) were added to the resulting mixture maintained at the same temperature as above, and stirring was continued for 60 minutes to give an aqueous emulsion comprising the particles of the polymeric resin and having a content of non-volatile components of 45%, a pH of 7.2 and a viscosity of 40 cps at 25° C. The particle size of the polymeric resin was 0.191μ and was substantially even. Tg, 15° C.

COMPARATIVE EXAMPLE 1

In the same manner as in Example 3 but using a first mixture comprising acrylic acid (6 parts), dimethylethanolamine (7.41 parts), 2-hydroxyethyl acrylate (6 parts) and deionized water (90 parts), an aqueous emulsion comprising the particles of the polymeric resin was produced. The aqueous emulsion had a content of non-volatile components of 45%, a pH of 7.7 and a viscosity of 56 cps at 25° C. This emulsion contained lumps in an amount of 1%, and its mechanical stability was inferior. The particle size of the polymeric resin was 0.215μ.

COMPARATIVE EXAMPLE 2

In the same manner as in Example 3 but using a first mixture comprising acrylic acid (15 parts), dimethylethanolamine (18.54 parts), 2-hydroxyethyl acrylate (6 parts) and deionized water (90 parts) and a second mixture comprising methyl methacrylate (76.5 parts), styrene (76.5 parts), n-butyl acrylate (102 parts) and 2-hydroxyethyl acrylate (24 parts), an aqueous emulsion comprising the particles of the polymeric resin was produced. The aqueous emulsion had a content of non-volatile components of 45%, a pH of 7.9 and a viscosity of 270 cps at 25° C. This emulsion contained lumps in an amount of 0.5%. The particle size of the polymeric resin was 0.211μ.

EXAMPLE 29

To the aqueous emulsion obtained in Example 3 (70 parts), an aminoplast resin solution comprising hexamethoxymethylolmelamine ("Cymel 303" manufactured by American Cyanamid) (5.6 parts), ethylene glycol monobutyl ether (9.2 parts) and deionized water (3.7 parts) were added gradually while stirring with a labomixer to make a thermosetting coating composition.

The coating composition was applied onto a steel plate to make a coating layer of about 20μ in thickness after drying, following by thermosetting at 100° C., 120° C., 140° C. or 160° C. for 20 minutes to give a transparent coating film.

The coating film was extracted with acetone by the aid of a Soxhlet's extractor for 4 hours, and it was confirmed that the remainders on thermosetting at 100° C., 120° C., 140° C. and 160° C. were respectively 81%, 86%, 93% and 99%. The coating film showed good water resistance; no abnormality was observed when immersed in boiling water for 1 hour.

EXAMPLES 30 TO 42

In the same manner as in Example 29 but using the aqueous emulsion as obtained in any of Examples 4 to 27 (70 parts), a coating composition was prepared. The coating composition was applied onto a steel plate to make a coating layer of about 20μ in thickness after drying, followed by thermosetting at 100° C., 120° C., 140° C. or 160° C. for 20 minutes. The thus formed coating film was extracted with acetone by the aid of a Soxhlet's extractor for 4 hours.

The percentage of the remainders (insoluble materials) of the coating film and the appearance of the coating film (thermoset at 140° C.) after immersion in boiling water for 1 hour are shown in Table 2.

TABLE 2

| Example No. | Emulsion obtained in | Percentage of remainders after acetone extraction uz,9/25 (%) | | | | Appearance after immersion in boiling water |
|---|---|---|---|---|---|---|
| | | 100° C. | 120° C. | 140° C. | 160° C. | |
| 30 | Ex. 4 | 79 | 84 | 91 | 98 | Normal |
| 31 | Ex. 5 | 79 | 85 | 94 | 100 | Normal |
| 32 | Ex. 6 | 81 | 88 | 93 | 99 | Normal |
| 33 | Ex. 7 | 76 | 81 | 88 | 96 | Normal |
| 34 | Ex. 8 | 73 | 83 | 90 | 97 | Normal |
| 35 | Ex. 9 | 85 | 86 | 92 | 98 | Normal |
| 36 | Ex. 10 | 81 | 87 | 92 | 98 | Normal |
| 37 | Ex. 11 | 83 | 88 | 93 | 98 | Normal |
| 38 | Ex. 12 | 83 | 87 | 93 | 99 | Normal |
| 39 | Ex. 13 | 80 | 88 | 91 | 98 | Normal |
| 40 | Ex. 14 | 82 | 88 | 93 | 99 | Normal |
| 41 | Ex. 26 | 83 | 87 | 93 | 99 | Normal |
| 42 | Ex. 27 | 81 | 86 | 95 | 100 | Normal |

COMPARATIVE EXAMPLES 3 AND 4

In the same manner as in Example 29 but using the aqueous emulsion obtained in Comparative Example 1 or 2, a coating composition was prepared. The coating composition was applied onto a steel plate, followed by thermosetting to give a coating film. The coating film was extracted with acetone for 4 hours, and the percentage of the remainders was determined. The coating film was also immersed in boiling water for 1 hour, and the appearance was observed.

The results are shown in Table 3.

TABLE 3

| Comparative Example No. | Emulsion obtained in | Percentage of remainders after acetone extraction (%) | | | | Appearance of coating film after immersion in boiling water (thermoset at 140° C.) |
|---|---|---|---|---|---|---|
| | | 100° C. | 120° C. | 140° C. | 160° C. | |
| 3 | Comparative 1 | 58 | 71 | 79 | 91 | Whitening, blister |
| 4 | Comparative 2 | 61 | 74 | 80 | 93 | Some whitening, blister |

What is claimed is:

1. An aqueous emulsion comprising water and a polymeric resin, said emulsion having a viscosity of from 10 to 50,000 cps at 25° C. and a polymeric resin content of from 2 to 65% by weight, said polymeric resin being prepared by a process which comprises polymerizing (a) at least one amino acid of either one of the formulae Ia and Ib:

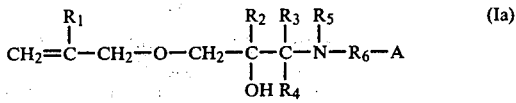

wherein $R_1$, $R_2$, $R_3$ and $R_4$ are each hydrogen, methyl or ethyl, $R_5$ is hydrogen or $C_1$-$C_{20}$ alkyl optionally having at least one of —SO—, —COO— and —O— in the alkyl chain, $R_6$ is $C_1$-$C_{12}$ alkylene optionally substituted with one or more of —OH, —SH, —SR$_7$ (wherein $R_7$ is $C_1$-$C_4$ alkyl) and $C_1$-$C_4$ alkyl, or phenylene optionally substituted with one or more of $C_1$-$C_4$ alkyl, and A is —COOH or —SO$_3$H;

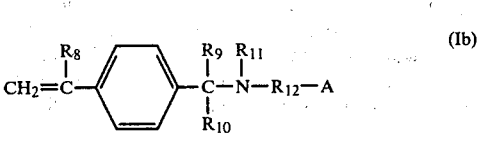

wherein $R_8$, $R_9$ and $R_{10}$ are each hydrogen or $C_1$-$C_6$ alkyl, $R_{11}$ is hydrogen, $C_1$-$C_{20}$ alkyl optionally having at least one of —SO—, —COO— and —O— in the alkyl chain, or a group of the formula

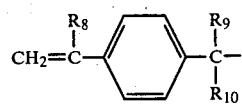

(wherein $R_8$, $R_9$ and $R_{10}$ are each as defined above), $R_{12}$ is $C_2$-$C_{12}$ alkylene optionally substituted with one or more $C_1$-$C_6$ alkyl, or phenylene optionally substituted with one or more $C_1$-$C_4$ alkyl, and A is as defined above, with (b) at least one other polymerizable monomer, in an aqueous medium, the component (a) and at least a portion of the component (b) being introduced separately into the reaction system.

2. A coating composition comprising the aqueous emulsion according to claim 1, and a suitable additive for a coating composition, selected from the group consisting of an aminoplast resin, a phenoplast resin, an epoxy resin, a pigment, a filler, a viscosity enhancer, an adhesive agent, a surfactant, a pH regulator, water and an organic solvent.

3. A coating composition according to claim 2, which comprises an aminoplast resin as an additive.

4. A coating composition according to claim 1, wherein the other polymerizable monomer as the component (b) is a member selected from the group consisting of carboxyl group-containing monomers, hydroxyl group-containing monomers, nitrogen-containing alkyl acrylates and methacrylates, polymerizable amides, polymerizable nitriles, alkyl acrylates and methacrylates, polymerizable aromatic compounds, α-olefin compounds, vinyl compounds and diene compounds.

5. A coating composition according to claim 1, wherein the other polymerizable monomer as the component (b) comprises a member selected from the group consisting of carboxyl group-containing monomers, hydroxyl group-containing monomers, nitrogen-containing alkyl acrylates and methacrylates, polymerizable amides and polymerizable nitriles.

6. A coating composition according to claim 1, wherein the other polymerizable monomer as the component (b) comprises a hydroxyl group-containing monomer.

7. A coating composition according to claim 1, wherein the polymeric resin has a glass transition point of −60° to 100° C.

* * * * *